United States Patent
Bouquerand et al.

(10) Patent No.: US 11,202,463 B2
(45) Date of Patent: Dec. 21, 2021

(54) ENCAPSULATED PLASMOLYSED MICRO-ORGANISM PARTICLES

(71) Applicant: FIRMENICH SA, Geneva (CH)

(72) Inventors: Pierre-Etienne Bouquerand, Geneva (CH); Nathalie Vivien Castioni, Ornex (FR); Anupama Koorapati, Plainsboro, NJ (US); Serge Maio, Geneva (CH); François Meyer, Geneva (CH)

(73) Assignee: FIRMENICH SA, Geneva (CH)

( * ) Notice: Subject to any disclaimer, the term of this patent is extended or adjusted under 35 U.S.C. 154(b) by 1171 days.

(21) Appl. No.: 14/770,452

(22) PCT Filed: Feb. 17, 2014

(86) PCT No.: PCT/EP2014/052991
§ 371 (c)(1),
(2) Date: Aug. 25, 2015

(87) PCT Pub. No.: WO2014/128071
PCT Pub. Date: Aug. 28, 2014

(65) Prior Publication Data
US 2016/0015061 A1 Jan. 21, 2016

Related U.S. Application Data

(60) Provisional application No. 61/769,120, filed on Feb. 25, 2013.

(51) Int. Cl.
*A23L 1/22* (2006.01)
*A23L 29/10* (2016.01)
(Continued)

(52) U.S. Cl.
CPC ............... *A23L 29/10* (2016.08); *A23L 27/72* (2016.08); *A23L 29/065* (2016.08); *C11B 9/00* (2013.01); *A23V 2002/00* (2013.01)

(58) Field of Classification Search
None
See application file for complete search history.

(56) References Cited

U.S. PATENT DOCUMENTS 4,001,480 A   1/1977 Shank
5,521,089 A   5/1996 Ishiguro et al.
(Continued)

FOREIGN PATENT DOCUMENTS

EP   242135   10/1987
EP   414283   2/1991
(Continued)

OTHER PUBLICATIONS

Paramera et al. "Microencapsulation of curcumin in cells of *Saccharomyces cerevisiae*" Food Chemistry vol. 125 2011 pp. 892-902 (Year: 2011).*

(Continued)

*Primary Examiner* — Felicia C Turner
(74) *Attorney, Agent, or Firm* — Armstrong Teasdale LLP

(57) ABSTRACT

Provided herein are formulations of flavors and fragrances encapsulated in plasmolysed micro-organisms, as well as glass particles or beads comprising these encapsulated flavors and fragrances. Also provided herein are methods of making formulations of encapsulated flavors and fragrances.

14 Claims, 2 Drawing Sheets

(51) Int. Cl.
*C11B 9/00* (2006.01)
*A23L 27/00* (2016.01)
*A23L 29/00* (2016.01)

(56) References Cited

U.S. PATENT DOCUMENTS

| | | | |
|---|---|---|---|
| 6,607,771 B2 | 8/2003 | Benczedi et al. | |
| 2005/0118273 A1* | 6/2005 | Sasaki | A23G 3/366 |
| | | | 424/490 |

FOREIGN PATENT DOCUMENTS

| | | |
|---|---|---|
| EP | 453316 | 10/1991 |
| EP | 528466 | 2/1993 |
| FR | 2179528 | 11/1973 |
| WO | WO1994009653 | 10/1987 |
| WO | WO 1993011869 | 6/1993 |
| WO | WO2010017372 | 3/2001 |
| WO | WO2004045588 | 6/2004 |
| WO | WO2005102508 | 11/2005 |
| WO | WO2008075945 | 6/2008 |
| WO | WO2009053711 | 4/2009 |

OTHER PUBLICATIONS

International Search Report and Written Opinion, application PCT/EP2014/052991, dated Jun. 6, 2014.

\* cited by examiner

ENCAPSULATED PLASMOLYSED MICRO-ORGANISM PARTICLES

TECHNICAL FIELD

The technical field relates to formulations of encapsulated flavors in glassy particles and plasmolysed organisms.

BACKGROUND OF THE INVENTION

Delivery systems for the controlled release of flavor or fragrance compounds and methods of making them have been reported. Microcapsules made of organisms used to encapsulate flavors or fragrances are known. These product and processes have, amongst other limitations, limitations in the amount of the flavor or fragrance that can be encapsulated.

SUMMARY OF THE INVENTION

Provided herein is a composition comprising a homogenous paste comprising:
a) a plasmolysed micro-organism;
b) a flavor or fragrance; and
c) water wherein the micro-organism to water ratio is provided in an amount, by weight, in the range of about 1.5:1 to 4:1 and the flavor or fragrance is encapsulated in the plasmolysed organism.

Also provided herein is a method of making a plasmolysed micro-organism encapsulated flavor or fragrance comprising combining a flavor or fragrance, a plasmolysed micro-organism and water for a time sufficient to form a viscous paste or cake wherein the ratio of the micro-organism to the water, by weight, is in the range of about 1.5:1 to about 4:1.

Further provided herein is a glass particle or bead comprising:
a) a plasmolysed micro-organism encapsulated flavor or fragrance wherein the micro-organism encapsulated flavor or fragrance comprises a viscous cake formed from the mixture of the plasmolysed micro-organism, the flavor or fragrance, and water wherein the ratio of the micro-organism to the water, by weight, is in the range of about 1.5:1 to about 4:1 and wherein the cake is provided in an amount, by weight, of up to about 55% of total weight of the particle; and
b) a carrier comprising a polymeric water soluble emulsifier and optionally a carbohydrate wherein the emulsifier is provided in an amount, by weight, of about 5% up to about 100% of the total weight of the carrier and the carrier is provided in an amount, by weight, of about up to about 80% of the total weight of the particle.

DESCRIPTION OF THE INVENTION

Figure 1:
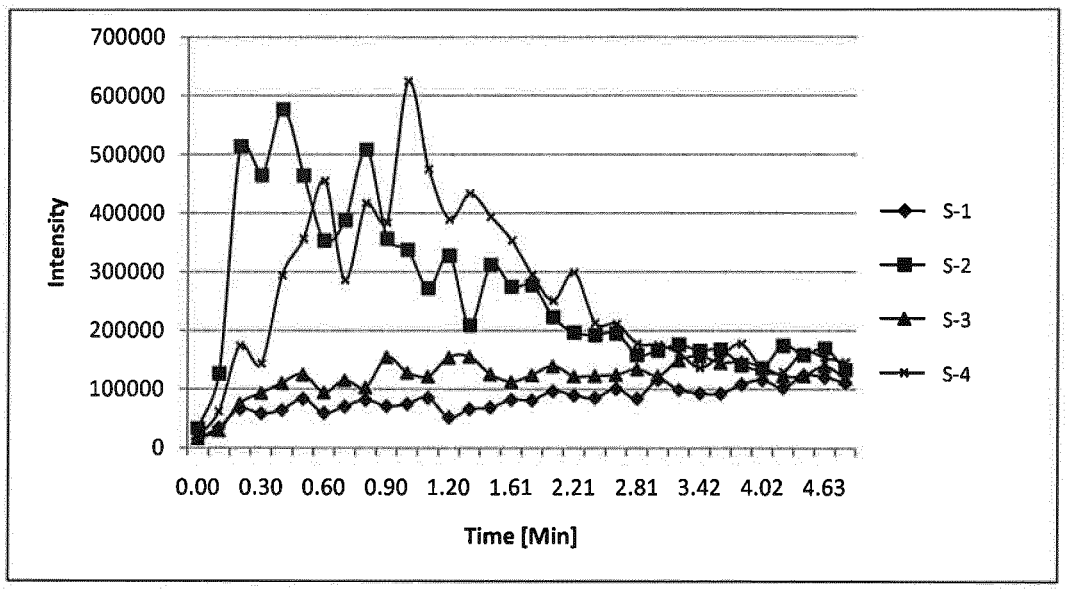
FIG. 1 is directed to the comparison of the Menthol release from different Menthol+cooling agent flavored chewing gums (Iso-Load) by APCI-MS nose test.

For the Summary, Description and Claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of".

In carrying out particular embodiments provided herein, a plasmolysed micro-organism is selected from the group consisting of fungi, a bacteria, algae, protozoa, or mixtures of two or more of these. In a particular embodiment the micro-organism is a fungus or a bacterium, more particularly it may comprise a yeast.

The micro-organism may be pre-treated to increase its permeability or to remove undesired odors or aromas. Such pre-treatments are disclosed in U.S. Pat. No. 5,521,089, col. 2, line 58 to col. 4, line 63 and WO 93/11869. A peroxygen bleaching of micro-organisms for removing odor and lightening the color of micro-organisms is disclosed. A micro-organism that has at least a part of its endogenous intracellular material removed is defined herein as a "plasmolysed micro-organism."

The plasmolysed micro-organism cake provided herein comprises a mixture of a micro-organism and water wherein the ratio, by weight, ranges from about 1.5:1 up to about 1.5:4. In another aspect, the mixture of the micro-organism and water is provided in a ratio that ranges from about 1.5:1 up to about 2.5:1. In a particular embodiment, the micro-organism and water mixture is provided in a ratio, by weight, of about 2:1.

In some embodiments, the plasmolysed micro-organism cake, and the process for making it, may provide a flavor or fragrance load in the cake in an amount, by weight, of up to about 50%, up to about 55% and further up to about 60% of the total weight of the cake. Further provided herein is a method of making a glass particle or bead comprising:
1) blending
   (a) a plasmolysed micro-organism encapsulated flavor or fragrance wherein the plasmolysed micro-organism encapsulated flavor or fragrance comprises a viscous cake formed from a mixture of water, the flavor or fragrance, and the plasmolysed micro-organism;
   (b) a carrier comprised of a polymeric water soluble emulsifier and optionally a carbohydrate;
2) heating the blend in an extruder to a temperature sufficient to form a molten mass;
3) extruding the molten mass;
4) cutting the extruded molten mass into granules; and
5) allowing the granules to cool to form a glassy particle.
A lubricant may be added to the blend.

The carrier provided herein is a carrier comprising a water soluble polymeric emulsifier and optionally a carbohydrate. The carrier is provided in the formulations described herein in an amount that ranges, by total weight of the formulation, from about 40 up to about 80%, by weight, of the total weight of the particle provided herein. In a further embodiment, the carrier is provided in an amount of about 50 up to about 75%, more particularly from about 55 up to about 70%, by weight, of the total weight of the particle provided herein.

In a particular embodiment, provided herein is a carrier comprising a carbohydrate or carbohydrate derivative which can be readily processed through extrusion techniques to form a dry extruded solid. Particular examples of suitable materials include those selected from the group consisting of sucrose, glucose, lactose, maltose, fructose, ribose, dextrose, isomalt, sorbitol, mannitol, xylitol, lactitol, maltitol, pentatol, arabinose, pentose, xylose, galactose, Trehalose®, hydrogenated corn syrup, maltodextrin, agar, carrageenan, gums, polydextrose and derivatives and mixtures thereof. Other suitable carrier ingredients are cited in reference texts such as H. Scherz, Hydrokolloide: Stabilisatoren, Dickungs- and Geliermittel in Lebensmittel, Band 2 der Schriftenreihe Lebensmittelchemie, Lebensmittelqualität, Behr's VerlagGmbH & Co, Hamburg, 1996. In a particular embodiment provided herein comprises a maltodextrin having a dextrose equivalent not above twenty (≤20 DE).

Particularly, the carbohydrate may comprise a non-emulsifying water soluble material such as, but not limited to, maltodextrins. In a particular embodiment, the carbohydrate is a maltodextrin with a dextrose equivalent (DE) of about 1 to about 20. In a particular embodiment, the maltodextrin is selected from a maltodextrin with a DE of about 10 up to about 18 DE. In another embodiment, the carbohydrate comprises corn syrup with a DE from 21 up to 49. Any carbohydrate can be used that is made by the hydrolysis of starches from different origins such as, but not limited to, maize, wheat, potato or rice. In another embodiment, the carbohydrate is a hydrogenated starch hydrolysate (e.g., HSPolyols), fructose oligosaccharides (e.g., but not limited to Inuline from Orafit), soluble fibers such as for example but not limited to Nutriose (Roquette) and pregelatinized starch.

In another aspect, the carrier comprises a polymeric emulsifier which comprises a water soluble material such as Capsul (National starch). In another embodiment, the emulsifier is an akenyl succinated starch, more particularly and ocytenyl succinated starch (OSS). Some particular example, but not limited to, are N-lock (Emcap), Purity gum (Cargill). In another embodiment, the emulsifier is gum Arabic.

In a particular embodiment, the carrier is provided in an amount that ranges, by weight, of about 40% to about 80% of the total weight of the particle or bead. Particularly the carrier is provided in an amount, by weight of about 50% to about 75% and more particularly from about 55% to about 70.

In a particular embodiment, the emulsifier may be provided in an amount, by weight, from about 5% to about 100%, particularly from about 5% to about 40%, even more particularly from about 10% to about 40%, and more particularly at about 10% of the total weight of the carrier.

In another embodiment, a lubricant is provided herein. While not wishing to be bound to any theory it is believed that the lubricant reduces shear and expansion of the molten mass at the exit die. In some embodiments, the lubricant may comprise a medium chain triglyceride (MCT). In another embodiment, the lubricant comprises a micellar surfactant like lecithin or a fatty acid ester (e.g., citric, tartaric, acetic), DATEM, CITREM or mixtures of the above. In a particular embodiment, the lubricant is may be provided in an amount, by weight, up to about 5%, particularly about 0.2 up to about 5%, more particularly from about 0.8% up to about 2% and even more particularly about 1% of the total weight of the particle.

Extruded glassy particles comprising plasmolysed micro-organism cake may be obtained following the general methods set forth in U.S. Pat. No. 6,607,771, the whole of which is incorporated by reference herein. In a particular embodiment a carbohydrate, and at least one water soluble emulsifier are mixed and a non plasticizing flavor or fragrance is dispersed into the mix. In one embodiment, water is added to the mix until a free flowing powder is formed. Ideally the water is added without forming lumps. The components of the mixture described above can be premixed for example in a bowl or even stepwise into an extruder. The components may be mixed prior to being added to the extruder or alternatively, added stepwise or as a mixture of one or more of the components that make up the particle.

In some embodiments, the water acts as a plasticizer. The amount of water may be adjusted to obtain a glass transition temperature (Tg) between 30 and 100° C., more particularly at about 50° C. In a particular embodiment, the encapsulation of the plasmolysed micro-organism cake may be done without the addition of any further water than that which is provided by the content of the water in the plasmolysed micro-organism cake. In another embodiment, the water may be added to the process for making the glass transition in a desired range. In a particular embodiment the cake and carrier are blended in the substantial absence of added water, for example less than 2%, more particularly less than 1%, even more particularly less than 0.5%. In yet a further particular embodiment, no additional water is added than that which is included in the plasmolysed micro-organism cake.

The blended powder may then be extruded. In a particular embodiment, the powder may be extruded at a throughput of 500 g/h through a 0.7 mm die hole using for example, but not limited to a Thermo Prism 16 mm twin-screw lab extruder equipped with a cutter knife in order to granulate the melt at the die exit. In a particular embodiment, the screws are configured so that they have two mixing zones. In a further embodiment the temperature profile may be 80° C.-100-105-108° C. in a first mixing zone to the die plate. The melt temperature may range from about 80° C. and up to about 120° C. In a particular embodiment, the temperature of the mix is about 108° C.

In a further embodiment, the temperature ranges at the die exit ranges from about 90 to about 130° C. and particularly at about 98° C. In a particular embodiment, the pressure is maintained below 100 bar. Particularly, the temperature at the die exit may be around 50° C. higher than the expected Tg.

The softening or glass transition temperature is preferably kept above 40° C. to guarantee the free flowing nature of the produced powder at ambient temperature. A low water content to guarantee that the carrier's glass transition temperature is above room temperature and preferably above 40° C. may be added to the mixture. The glass transition temperature of the flavor or fragrance/carbohydrate mixture depends on the amount of water added to the initial mixture. The Tg decreases when the proportion of water increases. Ideally, the proportion of water added to the mixture will be low, i.e., such that the glass transition temperature of the resulting mixture is substantially equal to the glass transition temperature desired for the final flavor or fragrance delivery system, i.e., the extruded product. In one embodiment a glass transition temperature Tg is provided significantly above the temperature at which the particle will be stored and subsequently used. Ideally, the temperature should be at least above room temperature and preferably above 40° C. The proportions in which water is employed may therefore vary in a wide range of values which the skilled person is capable of adapting and choosing as a function of the carbohydrate glass used in the matrix and the required Tg of the final product. For instance, for a carbohydrate glass having a DE (dextrose equivalent) of 18, proportions from 5 to 10% of water in the mixture can be used.

In some embodiments, the size (diameter) of the particle or bead provided herein ranges in size from about 0.4 mm up to about 5 mm, particularly from about 0.5 mm up to about 2 mm, more particularly from about 0.5 mm up to about 1.4 mm, more particularly from 0.5 mm up to 1 mm and even more particularly at about 0.6, 0.7 or 1.4 mm.

The above processes of using making a plasmolysed micro-organism cake and then further encapsulating the cake to make a glass particle or bead provides for a high flavor or fragrance load in the particle. In some embodiments the particle comprises a flavor or fragrance in an amount of up to about, by weight, 20%, up to 25%, particularly up to 30% and more particularly up to 33% of the total weight of the particle. In some embodiments, the particle comprises a flavor or fragrance in an amount of greater than about, by weight, 12% up to about 25% of the total weight of the particle.

The flavors and fragrances that have particular applicability here are those that are difficult to entrap in large amount using twin-screw extrusion but which can diffuse inside a plasmolysed micro-organism, in particular those flavors and fragrances that have a Log P of >2 with a Mw<600 Daltons.

By "flavor or flavoring composition", it is meant here a flavoring ingredient or a mixture of flavoring ingredients, solvents or adjuvants of current use for the preparation of a flavoring formulation, i.e. a particular mixture of ingredients which is intended to be added to an edible composition or chewable product to impart, improve or modify its organoleptic properties, in particular its flavor and/or taste. Flavoring ingredients are well known to a person skilled in the art and their nature does not warrant a detailed description here, which in any case would not be exhaustive, the skilled flavorist being able to select them on the basis of his general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the art.

In a particular embodiment, the flavor is a mint flavor. In a more particular embodiment, the mint is selected from the group consisting of peppermint and spearmint.

In a further embodiment, the flavor is a cooling agent or mixtures thereof.

In another embodiment, the flavor is a menthol flavor.

Flavors that are derived from or based on fruits where citric acid is the predominant, naturally-occurring acid include but are not limited to, for example, citrus fruits (e.g. lemon, lime), limonene, strawberry, orange, and pineapple. In one embodiment, the flavors food is lemon, lime or orange juice extracted directly from the fruit. Further embodiments of the flavor comprise the juice or liquid extracted from oranges, lemons, grapefruits, key limes, citrons, clementines, mandarins, tangerines, and any other citrus fruit, or variation or hybrid thereof. In a particular embodiment, the flavor comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a particular embodiment, the flavor comprises a composition that comprises limonene, in a particular embodiment, the composition is a citrus that further comprises limonene.

In another particular embodiment, the flavor comprises a flavor selected from the group comprising strawberry, orange, lime, tropical, berry mix, and pineapple.

The phrase flavor includes not only flavors that impart or modify the smell of foods but include taste imparting or modifying ingredients. The latter do not necessarily have a taste or smell themselves but are capable of modifying the taste that other ingredients provides, for instance, salt enhancing ingredients, sweetness enhancing ingredients, umami enhancing ingredients, bitterness blocking ingredients and so on.

In a further embodiment, suitable sweetening components may be included in the particles described herein. In a particular embodiment, a sweetening component is selected from the group consisting of sugar (e.g., but not limited to sucrose), a stevia component (such as but not limited to stevioside or rebaudioside A), sodium cyclamate, aspartame, sucralose, sodium saccharine, and Acesulfam K or mixtures thereof.

The dry particles provided herein may be suitable for conveying flavors to beverages, fluid dairy products, condiments, baked goods, frostings, bakery fillings, candy, chewing gum and other food products.

Beverages include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation techniques.

Fluid dairy products include, without limitation, non-frozen, partially frozen and frozen fluid dairy products such as, for example, milks, ice creams, sorbets and yogurts.

Condiments include, without limitation, ketchup, mayonnaise, salad dressing, Worcestershire sauce, fruit-flavored sauce, chocolate sauce, tomato sauce, chili sauce, and mustard.

Baked goods include, without limitation, cakes, cookies, pastries, breads, donuts and the like.

Bakery fillings include, without limitation, low or neutral pH fillings, high, medium or low solids fillings, fruit or milk based (pudding type or mousse type) fillings, hot or cold make-up fillings and nonfat to full-fat fillings.

In one embodiment, the encapsulated flavors provide an initial burst of flavor followed by a sustained release of the flavors.

In another aspect, a plasmolysed micro-organism cake and glass particles encapsulating the cake contain a higher load of flavor or fragrance over what is typically achieved for example through typical extrusion processes.

Particular fragrances that may be used herein are selected from the group consisting of 1-Pentyl-2-propenyl acetate, Hexylcinnamic aldehyde, 8,12-epoxy-13,14,15,16-tetranor-labdane, Tricyclo[5.2.1.0(2,6)]dec-3,4-en-1-yl acetate, Coumarine, 2-Pentyl-1-cyclopentanol, Cyclamen aldehyde, α-Damascone, Dihydromyrcenol, pentadecenolide, methyl ionone, Lilial®, Linalol, cis-4-(1,1-dimethyl)-1-cyclohexyl acetate, 3-methyl-(4,5)-cyclopentadecen-1-one, Tetrahydro-2-isobutyl-4-methyl-4(2H)-pyranol, γ-methyl-benzene pentanol, Hexyl salicylate, and Vertofix Coeur.

The following Examples are illustrative only and are not meant to limit the scope of the claims, the Summary or any invention presented herein.

EXAMPLES

Example 1

Production of Plasmolysed Organism Encapsulated Lemon Flavor Yeast Cake

About 50 g of dried plasmolysed yeast (Ohly washed williams) was dispersed within 75 g of lemon flavor with a spatula within a one liter glass jar. About 25 g of distilled water was added and gently stirred with a spatula to obtain a yeast cells to water ratio about 2:1. The jar was then sealed with a screw cape at left to stand for 12 hours at room temperature so that the liquid dispersion was observed to be a homogeneous thick paste. The dispersion was roughly mixed with a spatula and the paste was left to stand for another 12 hours period at room temperature. After sitting for the second 12 hours, the dispersed paste was observed to be a brown cake ("yeast cake"). In summary, the cake had about 50% lemon flavor, 33% empty cells and about 17% water.

Example 2

Production of Glass Particles Comprising Encapsulated Lemon Flavor Yeast Cake

About 150 g of the "cake" made according to Example 1 was blended with 35 g of Capsul (National starch), 310 g of 18 DE maltodextrin (Roquette) and 5 g of lubricant (Firmenich) within a blade blender (Cut-o-Matic, Switzerland) and blended for less than 10 seconds at full speed. The resulting powder was poured into a Brabender (Switzerland) gravimetric feeder and feed into an extruder having two mixing zones separated by a relaxing zone with a twin-screw configuration. The temperature profile was about 108° C. at the level of the mixing zone and about 98° C. at the die zone. The pressure at the die zone was kept below 20 bars and the blend was mixed in a mixing zone. The mixture was extruded at a throughput of 0.5 kg/h through a 0.7 mm die hole using 16 mm a Thermo Prism twin-screw laboratory extruder (Thermo Electron Germany). The extruder was equipped with a cutterknife used to chop the melt at the die exit while it is still plastic. The extruded granules were collected and conveyed by air cyclone system (Thermo electron (Germany)) and allowed to cool at ambient temperature. The resulting particles have a glass transition higher than 40° C. and a size (diameter) of about 0.6 mm. In summary, the extruded particle comprises about 30% cake, about 69% carrier and about 1% lubricant. This corresponds to final flavor load of 15%. More than 90% of the flavor was retained as measured by hydro-distillation. To evaluate the proportion of the flavor which was present within the yeast cells and not just entrapped within the extrusion carrier, a differential gravimetric measurement was performed on the cake. From the thermograms 60% of the lemon was entrapped within the yeast. One conclusion is that within 15% load of extruded yeast cake, 9% of lemon was double encapsulated and 6% was dispersed within the carrier.

Example 3

Production of Glass Particles Comprising Encapsulated Mint Flavor Yeast Cake

Examples 1 and 2 were repeated but with the following ingredients and proportions: The yeast cake had about 55% mint flavor, 30% empty cells and about 15% added water. The extruded particles comprised about 45% cake, +54% carrier, and about 1% lubricant. Increasing the proportions of the cake means increasing the water addition up to 6.8% and decreasing the carrier fraction. The carrier was made of 90% 10 DE maltodextrin (Roquette-France) and 10% Capsul™ octenyl succinated starch. The glass transition of the extruded particles was greater than 40° C. to guarantee their physical stability. A flavor load about 25% was obtained with encapsulation efficiency about 100%.

Example 4

Production of Glass Particles Comprising Encapsulated Cooling-Mix Flavor Yeast Cake Examples 1 and 2 were repeated but with the following ingredients and proportions: The yeast cake had about 55% of a cooling mix composed of equal amount of menthol and cooling compound (WS 23 n° 927878), 30% empty cells and about 15% added water. The extruded particles comprised about 45% cake, +54% carrier, and about 1% lubricant. Like example 3, the carrier was based on 90% 10 DE maltodextrin (Roquette-France) and 10% Capsul™ octenyl succinated starch (National Starch—USA) to guarantee a glass transition higher than 40° C. (52° C.). A flavor load about 22% was obtained with encapsulation efficiency about 88% mixture.

Example 5

Loading Procedure of Plasmolysed Yeast Dispersed in Water

In a closed double-jacketed vessel equipped with an agitator, 113.2 g of plasmolysed yeast was dispersed within 649.1 g of warm water. The dispersion was constantly stirred and kept at 40° C. for 20 minutes to completely hydrate the yeast. Lemon flavor (37.7 g) was added to the dispersion and the whole mixture was stirred within the closed vessel at 40° C. for 2 hours. After this infusion step, the dispersion was dried using a mini-Büchi lab spray-drier with an inlet temperature of about 175° C. and an outlet temperature of about 85° C. The resulting powder had a flavor content of about 24% which corresponds to an encapsulation yield of 96%. The same process was carried out with mint and the Menthol—cooling mix flavors.

Example 6

A dry blended formulation of about 500 g was prepared by admixing the following ingredients:

| Ingredients | Parts by weight |
| --- | --- |
| Maltodextrin 18 DE (Roquette) | 79.5 |
| Capsul ™ (National Starch) | 9.0 |
| Lecithin | 1.0 |
| Lemon flavor | 6.0 |
| Tap water | 4.5 |
| | 100.0 |

Extruded glassy particles were obtained following the general methods set forth in WO01/17372 A1. In a bowl mixer 397.5 g of 18 DE maltodextrins was blended with 45 g of OctenylSuccinated Starch (Capsul™) and 5 g of lecithin. Then 30 g of lemon flavor was homogeneously dispersed into the mix. Finally 22.5 g of water was carefully added to the blend without forming lumps or increasing too much the temperature by the shear. The resulting mix was a free flowing powder. The powder was extruded at a throughput of 500 g/h through a 0.7 mm die hole using Thermo Prism 16 mm twin-screw lab extruder equipped with a cutterknife allowing to granulate the melt at the die exit. The screws configuration has two mixing zones. From the first mixing zone to the die plate, the temperature profile was 80° C.-100-105-108° C.

The resulting particles have a Tg>40° C. and a flavor retention>95%. The same process was carried with mint and cooling mix flavors.

Example 7

Chewing Gum Preparation

An unflavored chewing gum base was prepared having the following ingredients in the amounts shown (Table 1).

TABLE 1

| List of ingredients with weight by percent | |
| --- | --- |
| Ingredient | Amount (wt %) |
| Solsona T Gum Base (1) | 12.44 |
| Vega Gum Base (1) | 12.44 |
| Crystalline sorbitol P60W | 56.50 |
| Maltitol Syrup | 11.50 |
| Glycerin | 7.00 |
| Aspartame | 0.08 |
| Acesulfame K | 0.04 |

(1) ex Cafosa

A Sigma-blade mixer was pre-heated to 45° C.-50° C. and half of the polyols (Crystalline sorbitol P60W and Maltitol Syrup) were added. The gum base was pre-heated to 60° C.-65° C. and added to the mixer. Mixing was carried out for approximately 4 minutes. Finally, the remaining polyols, sweeteners (Aspartame and Acesulfame K) and humectants (Glycerin) were added and mixing continued for 4 minutes.

Example 8

Gum Preparation with Menthol/Cooling Flavor

The following samples were prepared to attain 0.5% by weight Menthol (50%)+Cooling Mix (50%) flavor of the total weight of the flavored gum formulation for each Sample (Iso-load).

Sample #1:

0.5%, by weight, the liquid flavor; 0.5%, by weight, mint; and 99% unflavored gum from Example 7 were combined and mixed for approximately 2 minutes to obtain a homogenous distribution. The final resulting flavored gum was laminated and cut into slabs.

Sample #2:

8.3%, by weight, of the encapsulated flavor of Example 6; 1%, by weight, Neobee, 0.5% mint and 90.2% unflavored gum from Example 7 were combined and mixed for approximately 2 minutes to obtain a homogenous distribution. The final resulting flavored gum was laminated and cut into slabs.

Sample #3:

1.9%, by weight, of the encapsulated flavor of Example 5; 1%, by weight, Neobee, 0.5% mint and 96.6% unflavored gum from Example 7 were combined and mixed for approximately 2 minutes to obtain a homogenous distribution. The final resulting flavored gum was laminated and cut into slabs.

Sample #4:

3.3%, by weight, of the encapsulated flavor of Example 4; 1%, by weight, Neobee, 0.5% mint and 95.2%, by weight, unflavored gum from Example 7 were combined and mixed for approximately 2 minutes to obtain a homogenous distribution. The final resulting flavored gums was laminated and cut into slabs.

The following samples were prepared to attain 1.5%, by weight, liquid or encapsulated, Menthol (50%)+Cooling Mix (50%) flavor of the total weight of the flavored gum formulation for each Sample (Iso-dosage).

Sample #5:

1.5%, by weight (1.5%, by weight, flavor), of the liquid flavor and 98.5% unflavored gum from Example 7 were combined and mixed for approximately 2 minutes to obtain a homogenous distribution. The final resulting flavored gum was laminated and cut into slabs.

Sample #6:

1.5%, by weight (0.01%, by weight, flavor), of the encapsulated flavor of Example 6; 1%, by weight, Neobee; and 97.5% unflavored gum from Example 7 were combined and mixed for approximately 2 minutes to obtain a homogenous distribution. The final resulting flavored gum was laminated and cut into slabs.

Sample #7:

1.5%, by weight (0.35%, by weight, flavor), of the encapsulated flavor of Example 5; 1%, by weight, Neobee; and 97.5% unflavored gum from Example 7 were combined and mixed for approximately 2 minutes to obtain a homogenous distribution. The final resulting flavored gum was laminated and cut into slabs.

Sample #8:

1.5%, by weight (0.33%, by weight, flavor), of the encapsulated flavor of Example 4; 1%, by weight, Neobee; and 97.5%, by weight, unflavored gum from Example 7 were combined and mixed for approximately 2 minutes to obtain a homogenous distribution. The final resulting flavored gum was laminated and cut into slabs.

Example 9

Gum Prepared with Mint Flavor by Adding 1.5%, by Weight, of the Various Flavor Formulations (Iso-Dosage)

Sample #9:
1.5%, by weight (1.5%, by weight, flavor), of the liquid flavor and 98.5% unflavored gum from Example 7 were combined and mixed for approximately 2 minutes to obtain a homogenous distribution. The final resulting flavored gum was laminated and cut into slabs (Iso-dosage).

Sample #10:
1.5%, by weight (0.01%, by weight, flavor), of the encapsulated flavor of Example 6; 1%, by weight, Neobee; and 97.5% unflavored gum from Example 8 were combined and mixed for approximately 2 minutes to obtain a homogenous distribution. The final resulting flavored gum was laminated and cut into slabs.

Sample #11:
1.5%, by weight (0.31%, by weight, flavor), of the encapsulated flavor of Example 5; 1%, by weight, Neobee; and 97.5% unflavored gum from Example 7 were combined and mixed for approximately 2 minutes to obtain a homogenous distribution. The final resulting flavored gum was laminated and cut into slabs.

Sample #12:
1.5%, by weight (0.38%, by weight, flavor), of the encapsulated flavor of Example 3; 1%, by weight, Neobee; and 97.5%, by weight, unflavored gum from Example 7 were combined and mixed for approximately 2 minutes to obtain a homogenous distribution. The final resulting flavored gum was laminated and cut into slabs.

Example 10

Gum Preparation with Lemon Flavor

The following samples were prepared to attain 0.7% by weight, Lemon flavor of the total weight of the flavored gum formulation for each Sample (Iso-load).

Sample #13:
0.7%, by weight, the liquid flavor; 1%, by weight, citric acid; and 98.3% unflavored gum from Example 7 were combined and mixed for approximately 2 minutes to obtain a homogenous distribution. The final resulting flavored gum was laminated and cut into slabs.

Sample #14:
11.7%, by weight, of the encapsulated flavor of Example 6; 1%, by weight, Neobee; 1%, by weight, citric acid; and 86.3% unflavored gum from Example 7 were combined and mixed for approximately 2 minutes to obtain a homogenous distribution. The final resulting flavored gum was laminated and cut into slabs.

Sample #15:
2.9%, by weight, of the encapsulated flavor of Example 5, 1%, by weight, Neobee; 1.%, by weight, citric acid; and 95.1% unflavored gum from Example 7 were combined and mixed for approximately 2 minutes to obtain a homogenous distribution. The final resulting flavored gums was laminated and cut into slabs.

Sample #16:
5.4%, by weight, of the encapsulated flavor of Example 4 1%, by weight, Neobee; 1%, by weight, citric acid; and 92.6%, by weight, unflavored gum from Example 7 were combined and mixed for approximately 2 minutes to obtain a homogenous distribution. The final resulting flavored gum was laminated and cut into slabs.

Example 11

Sensory Evaluation

Twelve trained panelists evaluated each chewing gum sample for flavor intensity. Samples 1-4 and 13-16 (Menthol+cooling mix and Lemon having the same amount of flavor 0.5% and 0.7% respectively) were evaluated on a scale of 0 to 10 where 0 denotes no flavor and 10 denotes very strong flavor effect. Samples 5-12 (mint/cooling and mint) were evaluated a scale of 0 to 5 where 0 denotes no flavor and 5 denotes very strong flavor effect. Statistical Analysis was done using ANOVA with Post Hoc Duncan's test.

The results for Samples 1-4 are displayed in Table 1.

TABLE 1

| Attribute - Mint Flavor | S-1 | S-2 | S-3 | S-4 | P-Value |
|---|---|---|---|---|---|
| 1 min | 5.6b | 8.1a | 8.8a | 6.3b | 0.000 |
| 5 min | 4.1c | 5.6ab | 6.6a | 4.8bc | 0.005 |
| 10 min | 2.8b | 4a | 4.8a | 4a | 0.010 |
| 15 min | 2.1b | 3.3a | 3.5a | 3ab | 0.088 |
| 20 min | 1.6 | 2.5 | 2.8 | 2.6 | 0.209 |

Samples 2 & 4 both had significantly more mint flavor intensity than Sample 1 after 1, 5, 10 and 15 minutes of chew (at 90% confidence). Sample 3 had more mint flavor intensity than Sample 1 after 10 and 15 minutes of chew (at 90% confidence). There was no significant difference in mint flavor intensity between any of the samples after 20 minutes of chew at 90% confidence.

The results for Samples 13-16 (Lemon Flavor) are presented in Table 2.

TABLE 2

| Attribute - Lemon Flavor | S-13 | S-14 | S-15 | S-16 | P-Value |
|---|---|---|---|---|---|
| 1 min | 5.2 | 6.1 | 5.2 | 5.5 | 0.324 |
| 5 min | 3.7 | 3.5 | 3.2 | 3.6 | 0.721 |
| 10 min | 2.6 | 2.8 | 2.1 | 2.3 | 0.416 |
| 15 min | 2.0 | 2.1 | 1.8 | 1.6 | 0.639 |
| 20 min | 1.4 | 1.8 | 1.2 | 1.3 | 0.244 |

There was no significant difference in lemon flavor intensity between the samples at any of the time points throughout the 20 minutes of chew (at 90% confidence).

The results for Samples 9-12 (Mint Flavor) are presented in Table 3.

TABLE 3

| | Attribute-Mint flavor | | | | | |
|---|---|---|---|---|---|---|
| | S-9 | S-10 | S-11 | S-12 | F calc. | Proba. |
| 30 sec | 3.09 B | 2.70 BC | 2.18 C | 4.80 A | 24.09 | <0.0001 *** |
| 1 min | 3.09 B | 2.65 C | 2.50 C | 4.65 A | 37.79 | <0.0001 *** |
| 3 min | 3.45 A | 2.03 B | 2.16 B | 3.85 A | 24.87 | <0.0001 *** |
| 5 min | 3.23 A | 1.50 C | 1.77 C | 2.68 B | 12.87 | <0.0001 *** |
| 10 min | 2.50 A | 1.20 B | 1.32 B | 1.65 B | 7.16 | 0.0010 ** |
| 15 min | 2.23 A | 1.10 B | 1.18 B | 1.15 B | 7.99 | 0.0005 *** |
| 20 min | 2.00 A | 0.90 B | 1.14 B | 1.05 B | 5.27 | 0.0052 ** |

TABLE 3-continued

Attribute-Mint flavor

| | S-9 | S-10 | S-11 | S-12 | F calc. | Proba. |
|---|---|---|---|---|---|---|
| 25 min | 1.41 A | 0.90 B | 0.94 B | 0.85 B | 3.31 | 0.0342 * |
| 30 min | 1.41 A | 0.90 B | 0.85 B | 0.85 B | 3.81 | 0.0209 * |

* significantly different at 95%,
** at 99% and
*** at 99.9% from Duncan comparison test The results for Samples 5-8 (Cooling Flavor) are presented in Table 4.

TABLE 4

Attribute-Cooling flavor

| | S-5 | S-6 | S-7 | S-8 | F calc. | Proba. |
|---|---|---|---|---|---|---|
| 30 sec | 3.63 A | 2.47 B | 1.95 C | 3.71 A | 30.55 | <0.0001 *** |
| 1 min | 4.21 A | 2.63 C | 2.58 C | 3.79 B | 27.76 | <0.0001 *** |
| 3 min | 4.11 A | 1.84 D | 2.68 C | 3.21 B | 29.84 | <0.0001 *** |
| 5 min | 3.95 A | 1.32 C | 2.50 B | 2.53 B | 32.03 | <0.0001 *** |
| 10 min | 3.74 A | 1.11 C | 2.18 B | 1.79 B | 36.35 | <0.0001 *** |
| 15 min | 3.42 A | 1.05 C | 2.05 B | 1.37 C | 30.24 | <0.0001 *** |
| 20 min | 2.74 A | 1.00 C | 1.68 B | 1.26 C | 25.03 | <0.0001 *** |
| 25 min | 2.58 A | 0.95 C | 1.50 B | 1.21 BC | 20.49 | <0.0001 *** |
| 30 min | 2.29 A | 0.95 C | 1.39 B | 1.11 BC | 16.94 | <0.0001 *** |

*** significantly different at 99.9% from Duncan comparison test

Sample 12 out performs all the encapsulation systems up to 5 minutes with regard to the Mint flavor (Table 3) and up to 3 minutes with the Menthol+Cooling Agent mix (Table 4). Sample 8 was statistically found to be significantly different at 99.9% up to 3 minutes when compared to samples 5, 6 and 7.

Example 12

Evaluation of Chewing Gums with Atmospheric Pressure Chemical Ionization—Mass Spectrometer (APCI-MS) Nose Test Samples were evaluated using APCI-MS (atmospheric pressure chemical ionization mass spectroscopy) nose in real time. The flavor load analysis of technologies was performed by the following methods:
1) Solvent extraction with diethylether:pentane 2:1
2) Steam distillation with a Clevenger type apparatus
3) Quantization with GC-FID (using internal standard and relative response factors)

Each sample was chewed for five minutes while breath was sampled for Menthol release from the nose using the APCI-MS nose interface.

Samples 1-4 (Iso-Load Cooling+menthol (with mint) Flavor) were tested using APCI-NS nose in real time and the results are presented in Table 5 and FIG. 1.

TABLE 5

| Real Time of Mean | S-1 | S-2 | S-3 | S-4 |
|---|---|---|---|---|
| 0.00 | 15325 | 33193 | 16199 | 19600 |
| 0.10 | 34437 | 126579 | 29918 | 62107 |
| 0.20 | 66178 | 513986 | 75796 | 173489 |
| 0.30 | 58629 | 464897 | 93880 | 143624 |
| 0.40 | 64374 | 576885 | 110467 | 293767 |
| 0.50 | 83456 | 464319 | 125386 | 356419 |

TABLE 5-continued

| Real Time of Mean | S-1 | S-2 | S-3 | S-4 |
|---|---|---|---|---|
| 0.60 | 59556 | 353207 | 95024 | 454963 |
| 0.70 | 70561 | 388068 | 115510 | 286355 |
| 0.80 | 81526 | 508539 | 102981 | 417149 |
| 0.90 | 71152 | 356615 | 154268 | 384195 |
| 1.00 | 74986 | 337498 | 128230 | 623998 |
| 1.10 | 85456 | 271937 | 122149 | 474969 |
| 1.20 | 52036 | 327260 | 154188 | 389751 |
| 1.30 | 65883 | 208649 | 155303 | 433173 |
| 1.41 | 68783 | 311525 | 125640 | 393586 |
| 1.61 | 82082 | 274529 | 113067 | 353088 |
| 1.81 | 81253 | 276458 | 124382 | 294639 |
| 2.01 | 96678 | 222588 | 139492 | 250775 |
| 2.21 | 89453 | 196469 | 122277 | 298173 |
| 2.41 | 85395 | 191747 | 122978 | 212318 |
| 2.61 | 100801 | 194920 | 124752 | 210989 |
| 2.81 | 84183 | 158540 | 134458 | 177682 |
| 3.01 | 116119 | 166028 | 122710 | 174714 |
| 3.22 | 99027 | 175597 | 149538 | 161494 |
| 3.42 | 93004 | 165134 | 156012 | 136310 |
| 3.62 | 92336 | 167693 | 144995 | 157513 |
| 3.82 | 108386 | 141261 | 146647 | 176701 |
| 4.02 | 115774 | 135730 | 137757 | 133659 |
| 4.22 | 102779 | 174306 | 122294 | 129244 |
| 4.42 | 123768 | 158515 | 123280 | 163581 |
| 4.63 | 120417 | 169421 | 139239 | 153643 |
| 4.83 | 110966 | 132622 | 118658 | 145596 |

The comparison of Sample 4 vs. the other samples indicates that it outperformed Sample 1 and Sample 3 with regard to menthol intensity. There was no real difference in maximum intensity, but there was a significant temporal delay between Samples 4 and 2.

Figure 2:
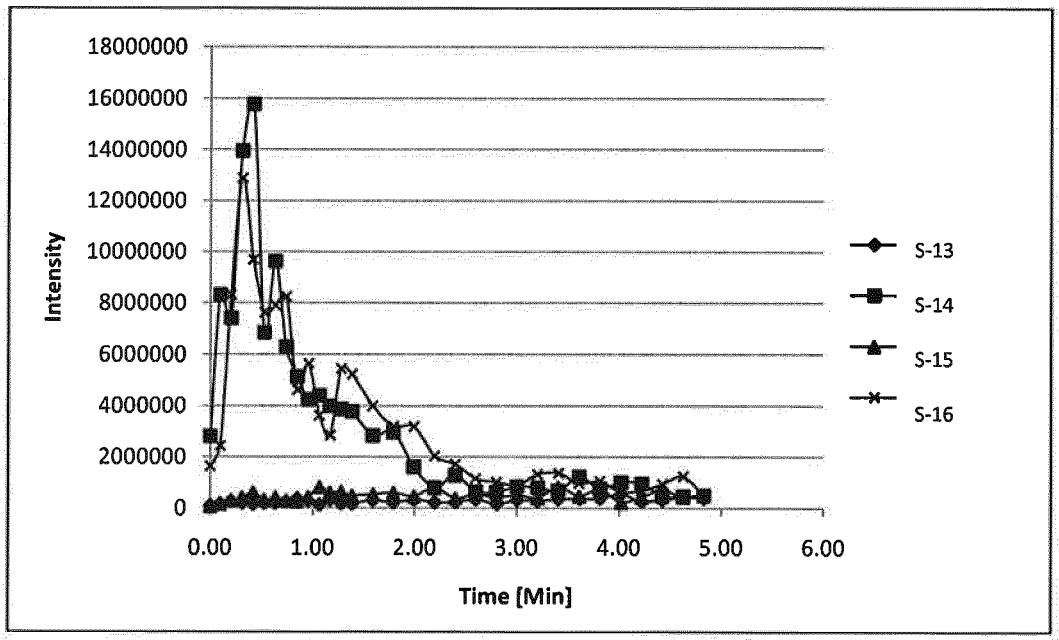
FIG. 2 shows the comparison of the Lemon Flavor Intensity from chewing gums (Iso-load) by APCI-MS nose test.

Samples 13-16 (Iso-Load Lemon Flavor) were tested by APCI-MS nose as described above. The results are presented in Table 6 and FIG. 2.

TABLE 6

| Real Time of Mean | S-13 | S-14 | S-15 | S-16 |
|---|---|---|---|---|
| 0.00 | 91705 | 1630725 | 2803373 | 71782 |
| 0.10 | 170521 | 2433294 | 8318229 | 157863 |
| 0.20 | 258557 | 8310137 | 7395482 | 300697 |
| 0.31 | 189610 | 12882806 | 13950902 | 400768 |
| 0.42 | 136250 | 9687738 | 15767027 | 601877 |
| 0.52 | 179421 | 7618496 | 6846614 | 318643 |
| 0.63 | 188389 | 7888296 | 9629829 | 413752 |
| 0.74 | 248113 | 8232934 | 6289378 | 298229 |
| 0.85 | 369036 | 4623950 | 5132223 | 272027 |
| 0.95 | 267698 | 5637191 | 4236606 | 418773 |
| 1.06 | 129626 | 3621578 | 4404041 | 813572 |
| 1.17 | 307259 | 2836960 | 3986527 | 608490 |
| 1.28 | 179712 | 5439182 | 3864269 | 636669 |
| 1.38 | 168140 | 5228974 | 3771433 | 484203 |
| 1.59 | 298634 | 3990712 | 2834125 | 537814 |
| 1.79 | 219515 | 3194645 | 2970111 | 601395 |
| 1.99 | 328298 | 3182276 | 1613010 | 463445 |
| 2.19 | 217799 | 2039083 | 803963 | 778406 |
| 2.40 | 232928 | 1711547 | 1276520 | 383546 |
| 2.60 | 341409 | 1157455 | 656502 | 531310 |
| 2.80 | 159318 | 1016572 | 625198 | 416038 |
| 3.01 | 310650 | 892351 | 842987 | 497130 |
| 3.21 | 274822 | 1318322 | 798625 | 393953 |
| 3.41 | 340903 | 1365171 | 679638 | 802513 |
| 3.61 | 361533 | 957773 | 1217057 | 467975 |
| 3.81 | 370735 | 1046363 | 768057 | 721767 |
| 4.02 | 542680 | 620693 | 1002660 | 222997 |
| 4.22 | 264350 | 682728 | 956522 | 431933 |
| 4.42 | 313121 | 931698 | 459631 | 686584 |
| 4.63 | 408859 | 1236326 | 454522 | 434805 |

The comparison of the lemon flavor systems shows that Sample 16 at the Iso-flavor load outperformed Sample 13 & Sample 15. The performance is slightly less in terms of maximum intensity (not believed to be sensorially significant) and there is no significant temporal difference in flavor release between Samples 14 and 16.

Figure 3:
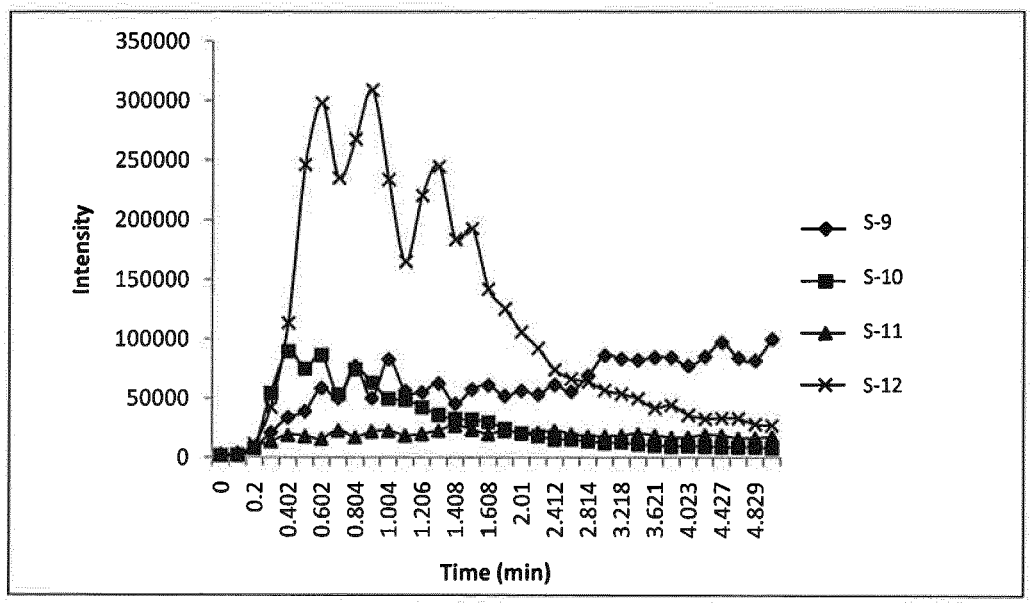
FIG. 3 shows the comparison of the Menthol release from Mint flavored chewing gums (Iso-dosage) by APCI-MS nose test.

Samples 9-12 (Iso-Dosage—Mint Flavor) were tested (APCI-MS nose) and the results are presented in Table 7 and FIG. 3.

TABLE 7

| Real Time of Mean | S-9 | S-10 | S-11 | S-12 |
| --- | --- | --- | --- | --- |
| 0 | 2754.0039 | 1798.8472 | 2165.268 | 2123.442 |
| 0.098 | 3586.9892 | 2284.1277 | 2692.447 | 2178.58 |
| 0.2 | 8278.9221 | 7805.9241 | 9241.938 | 11673.07 |
| 0.3 | 20971.008 | 54181.325 | 13846.81 | 42336.18 |
| 0.402 | 33652.717 | 89499.721 | 19197.74 | 113435.7 |
| 0.502 | 38751.305 | 74948.581 | 18248.18 | 246173.5 |
| 0.602 | 58473.9 | 86309.443 | 16028.13 | 297600.1 |
| 0.702 | 50013.651 | 53287.448 | 23060.27 | 235075.4 |
| 0.804 | 76858.371 | 74333.903 | 17517.3 | 267618.2 |
| 0.904 | 49916.392 | 63245.689 | 22165.7 | 308683 |
| 1.004 | 82578.163 | 49545.518 | 22643.25 | 233639.2 |
| 1.104 | 56196.316 | 48659.562 | 18710.4 | 164987.4 |
| 1.206 | 54813.334 | 42294.784 | 20076.04 | 220251.7 |
| 1.306 | 62236.797 | 35995.757 | 22893.53 | 244416.6 |
| 1.408 | 45193.136 | 32370.921 | 27123.18 | 183486.8 |
| 1.509 | 57245.774 | 32064.59 | 23807.19 | 192343.3 |
| 1.608 | 60649.732 | 29869.09 | 20029.18 | 141986.2 |
| 1.81 | 51812.301 | 24220.157 | 22825.35 | 125398.9 |
| 2.01 | 56132.64 | 20171.186 | 21054.47 | 105836.1 |
| 2.212 | 53112.853 | 18284.819 | 21132.39 | 91987.67 |
| 2.412 | 61042.881 | 15105.945 | 22769.56 | 74108.18 |
| 2.614 | 55464.305 | 15336.906 | 19935.24 | 66342.11 |
| 2.814 | 68984.06 | 14036.1 | 17893.31 | 63776.11 |
| 3.016 | 85972.706 | 12242.436 | 18280.08 | 56730.9 |
| 3.218 | 83123.57 | 12844.893 | 18839.57 | 53627.8 |
| 3.421 | 82085.875 | 11119.893 | 20111.29 | 49724.71 |
| 3.621 | 84351.457 | 10282.869 | 18876.98 | 41752.29 |
| 3.823 | 84170.4 | 9544.4467 | 17086.43 | 44314.06 |
| 4.023 | 77381.46 | 9971.295 | 17065.84 | 35992.99 |
| 4.225 | 84876.798 | 9204.4398 | 19422.72 | 32774.69 |
| 4.427 | 96940.151 | 8778.2854 | 18717.49 | 33300.94 |
| 4.627 | 83931.417 | 8705.8635 | 16385.89 | 33126.71 |
| 4.829 | 81786.744 | 8791.7421 | 16711.95 | 28136.72 |
| 5.029 | 99726.348 | 7987.4875 | 17816.13 | 27075.34 |

Figure 4:
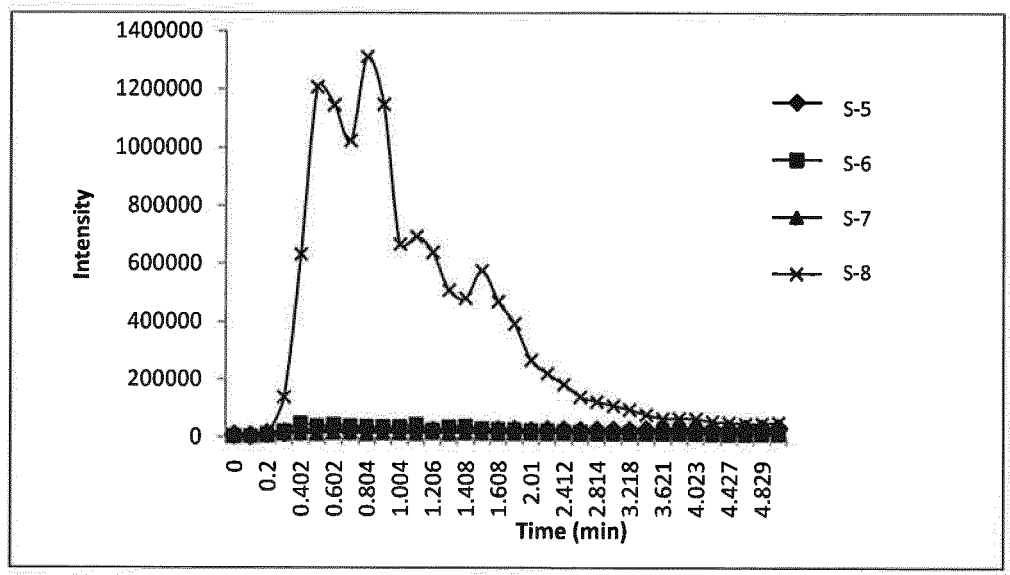
FIG. 4 shows the comparison of the Menthol release for the Menthol & Cooling Agent (CA) flavored chewing gums (Iso-dosage) APCI-MS nose test.

Samples 5-8 (Iso-Dosage Menthol+Cooling agent) were tested (APCI-MS nose) and the results are displayed in Table 8 and FIG. 4.

TABLE 8

| Real Time of Mean | S-5 | S-6 | S-7 | S-8 |
| --- | --- | --- | --- | --- |
| 0 | 5965.665 | 2760.892 | 2048.927 | 2778.232 |
| 0.098 | 3308.576 | 2408.959 | 3817.735 | 2849.723 |
| 0.2 | 10725.24 | 5924.178 | 11023.61 | 14386.88 |
| 0.3 | 14172.65 | 19298.74 | 10677.15 | 136895.6 |
| 0.402 | 17779.86 | 47314.66 | 12437.3 | 631121.1 |
| 0.502 | 21423.72 | 36528.77 | 11051.98 | 1207012 |
| 0.602 | 24402.97 | 43111.42 | 13828.64 | 1145425 |
| 0.702 | 18784.91 | 36531.91 | 4652.88 | 1022564 |
| 0.804 | 22835.98 | 35765.47 | 11565.82 | 1310693 |
| 0.904 | 22184.49 | 35239.92 | 14717.47 | 1147059 |
| 1.004 | 20159.43 | 35142.34 | 12879.64 | 666752.8 |
| 1.104 | 20221.49 | 42480.65 | 11715.3 | 693166.3 |
| 1.206 | 20924.65 | 24955.64 | 15356.38 | 638327.8 |
| 1.306 | 24549.87 | 33877.81 | 12374.33 | 507965.6 |
| 1.408 | 21872.85 | 37063.38 | 13878.28 | 480303.5 |
| 1.509 | 20404.23 | 28958.32 | 13226.73 | 574695 |
| 1.608 | 22895.44 | 26983.42 | 12697.85 | 468330.5 |
| 1.81 | 23700.63 | 25224.34 | 13272.82 | 391311.4 |
| 2.01 | 20071.76 | 21016.1 | 12857.81 | 265352.8 |
| 2.212 | 23613.49 | 21027.4 | 12621.37 | 219009.7 |
| 2.412 | 22459.44 | 18501.1 | 12722.82 | 181844.6 |
| 2.614 | 21222.55 | 17140.44 | 11127.51 | 138183.5 |
| 2.814 | 23368.64 | 14570.6 | 11001.66 | 121370.7 |

TABLE 8-continued

| Real Time of Mean | S-5 | S-6 | S-7 | S-8 |
| --- | --- | --- | --- | --- |
| 3.016 | 21828.26 | 14213.46 | 11934.97 | 107509.8 |
| 3.218 | 21499.24 | 14188.37 | 12059.99 | 94210.78 |
| 3.421 | 23999.16 | 13230.6 | 12311.71 | 76880.46 |
| 3.621 | 24753.14 | 12595.31 | 12075.22 | 62396.25 |
| 3.823 | 27280.1 | 10580.84 | 12354.06 | 63710.81 |
| 4.023 | 26388.81 | 10652.98 | 12196.49 | 61931.75 |
| 4.225 | 26198.03 | 9805.38 | 11997.76 | 52243.09 |
| 4.427 | 26537.27 | 8634.474 | 12207.72 | 49084.03 |
| 4.627 | 28714.66 | 8586.885 | 12440.02 | 45000.51 |
| 4.829 | 28234.18 | 9495.796 | 12988.75 | 46287.41 |
| 5.029 | 30059.37 | 9305.313 | 13457.37 | 49188.47 |

In both cases of iso-dosage (Mint flavor—table 7, FIG. 3 and Menthol—cooling agent mix, Table 8 & FIG. 4), Samples 12 and 8 had higher menthol intensity and had a later time to maximum intensity than the other samples at approximately 30 seconds.

What is claimed is:

1. A glass particle or bead comprising:
    a) a plasmolysed micro-organism encapsulated flavor or fragrance wherein the plasmolysed micro-organism encapsulated flavor or fragrance comprises a viscous cake formed from a mixture of water, the flavor or fragrance comprising from about 50 to about 60% of total weight of the viscous cake, and wherein the ratio of the micro-organism to the water, by weight, is in the range of about 1.5:1 to about 4:1 and wherein the cake is provided in an amount, by weight, of up to about 55% of the total weight of the particle; and
    b) a carrier comprising a polymeric water soluble emulsifier and optionally a carbohydrate wherein the polymeric water soluble emulsifier is provided in an amount, by weight, of about 5% up to about 100% of the total weight of the carrier and the carrier is provided in an amount, by weight, of up to about 80% of the total weight of the particle.

2. The glass particle or bead as recited in claim 1 wherein the glass particle or bead is a granule having a size greater than or equal to about 400 nanometers.

3. The glass particle or bead as recited in claim 2 wherein the granule has a size in a range of about 400 nm up to about 5 mm (millimeters).

4. The glass particle or bead as recited in claim 1 wherein the flavor or fragrance is provided in an amount, by weight, of up to about 33% of the total weight of the particle.

5. The glass particle or bead as recited in claim 4 wherein the flavor or fragrance is provided in an amount, by weight, of about 12% up to about 25%.

6. The glass particle or bead as recited in claim 1 wherein the micro-organism is yeast.

7. The glass particle or bead as recited in claim 1 wherein the flavor or fragrance comprises a flavor.

8. A food composition comprising a glass bead or particle comprising: a) a plasmolysed micro-organism encapsulated flavor or fragrance wherein the plasmolysed micro-organism encapsulated flavor or fragrance comprises a viscous cake formed from a mixture of water, the flavor or fragrance comprising from about 50 to about 60% of total weight of the viscous cake, and wherein the ratio of the micro-organism to the water, by weight, is in the range of about 1.5:1 to about 4:1 and wherein the cake is provided in an amount, by weight, of up to about 55% of the total weight of the particle; and
    b) a carrier comprising a polymeric water soluble emulsifier and optionally a carbohydrate wherein the polymeric water soluble emulsifier is provided in an amount, by weight, of about 5% up to about 100% of the total weight of the carrier and the carrier is provided in an amount, by weight, of up to about 80% of the total weight of the particles.

9. The food composition as recited in claim 8 wherein the food composition is selected from the group consisting of beverages, chewing gum, baked goods, candies, savory goods, and cereals.

10. The food composition as recited in claim 9 wherein the food composition is chewing gum.

11. The glass particle or bead as recited in claim 1 wherein the flavor or fragrance comprises a cooling component.

12. The glass particle or bead as recited in claim 1 wherein the flavor is selected from the group consisting of menthol and mint.

13. A method of making a glass particle or bead comprising:
   i) blending in an extruder
      a. a composition comprising a homogenous cake comprising:
         i. a plasmolysed micro-organism;
         ii. a flavor or fragrance comprising from about 50 to about 60% of the total weight of the homogeneous cake; and
         iii) water
      wherein the micro-organism to water ratio in the cake is provided in an amount, by weight, of about 1.5:1 to 4:1 and the flavor or fragrance is encapsulated in the plasmolysed micro-organism, with
      b. a carrier comprising a polymeric water soluble emulsifier and optionally a carbohydrate; and
      c. a lubricant;
   ii) heating the blend to a temperature sufficient to form a molten mass;
   iii) extruding the molten mass;
   iv) cutting the molten mass into granules; and
   v) allowing the granules to cool to form a glassy particle.

14. The glass particle or bead as recited in claim 1 wherein the glass particle or bead comprises a lubricant.

* * * * *